(12) United States Patent
Sato et al.

(10) Patent No.: US 6,641,341 B2
(45) Date of Patent: Nov. 4, 2003

(54) MACHINE TOOL

(75) Inventors: Hideshi Sato, Kanagawa (JP); Kazumasa Kono, Kanagawa (JP)

(73) Assignee: Makino Milling Machine Co., Ltd., Tokyo (JP)

(*) Notice: Subject to any disclaimer, the term of this patent is extended or adjusted under 35 U.S.C. 154(b) by 0 days.

(21) Appl. No.: 10/127,665

(22) Filed: Apr. 22, 2002

(65) Prior Publication Data

US 2002/0164222 A1 Nov. 7, 2002

(30) Foreign Application Priority Data

May 2, 2001 (JP) ........................... 2001-135283

(51) Int. Cl.[7] .................. B23C 1/00; B23D 7/00
(52) U.S. Cl. ................. 409/137; 409/134; 409/235
(58) Field of Search ..................... 409/134, 137, 409/235; 29/DIG. 50, DIG. 53, DIG. 56, DIG. 59, DIG. 60, DIG. 61, DIG. 79, DIG. 94, DIG. 102; 408/241 G

(56) References Cited

U.S. PATENT DOCUMENTS

| | | | |
|---|---|---|---|
| 4,955,770 A | | 9/1990 | Kitamura |
| 5,181,898 A | * | 1/1993 | Piotrowski ................. 483/3 |
| 5,263,800 A | * | 11/1993 | Chen ...................... 409/137 |
| 5,586,848 A | * | 12/1996 | Suwijn .................... 409/137 |
| 5,611,137 A | * | 3/1997 | Braun ....................... 29/560 |
| 5,624,363 A | * | 4/1997 | Kuriki ......................... 483/3 |
| 5,704,884 A | * | 1/1998 | Uemura et al. ............. 483/3 |
| 6,120,222 A | * | 9/2000 | Hiramoto et al. ......... 409/134 |
| 6,210,086 B1 | * | 4/2001 | Lecornet et al. .......... 409/137 |
| 6,315,106 B1 | * | 11/2001 | Hirano et al. ............. 409/137 |

FOREIGN PATENT DOCUMENTS

| | | |
|---|---|---|
| FR | 2 779 081 A | 12/1999 |
| GB | 904 219 A | 8/1962 |

OTHER PUBLICATIONS

Japanese Unexamined Utility Model Publication No. 58–93437, dated Jun. 24, 1982.
Japanese Unexamined Utility Model Publication No. 60–175541, dated Nov. 20, 1985.
Japanese Unexamined Utility Model Publication No. 61–103754, dated May 22, 1986.
Japanese Unexamined Utility Model Publication No. 2–35634, dated Mar. 7, 1990.
Japanese Unexamined Utility Model Publication No. 8–57739, dated Mar. 5, 1996.
Japanese Unexamined Utility Model Publication No. 9–309042, dated Dec. 2, 1997.

* cited by examiner

*Primary Examiner*—A. L. Wellington
*Assistant Examiner*—Dana Ross
(74) *Attorney, Agent, or Firm*—Paul & Paul

(57) ABSTRACT

A machine tool with an improved capability of discharging and collecting the cutting chips is disclosed. A bed (13) is provided with troughs (39) extending through the bed (13) in a direction substantially perpendicular to a direction of the movement of a table (15). The cutting chips are collected in the troughs (39) through a plurality of chutes (47) which have openings inclined downward towards the troughs (39) and which are provided below the upper surface of the table 15, to be discharged to the outside through chip discharge means (41) disposed in the troughs (39).

12 Claims, 3 Drawing Sheets

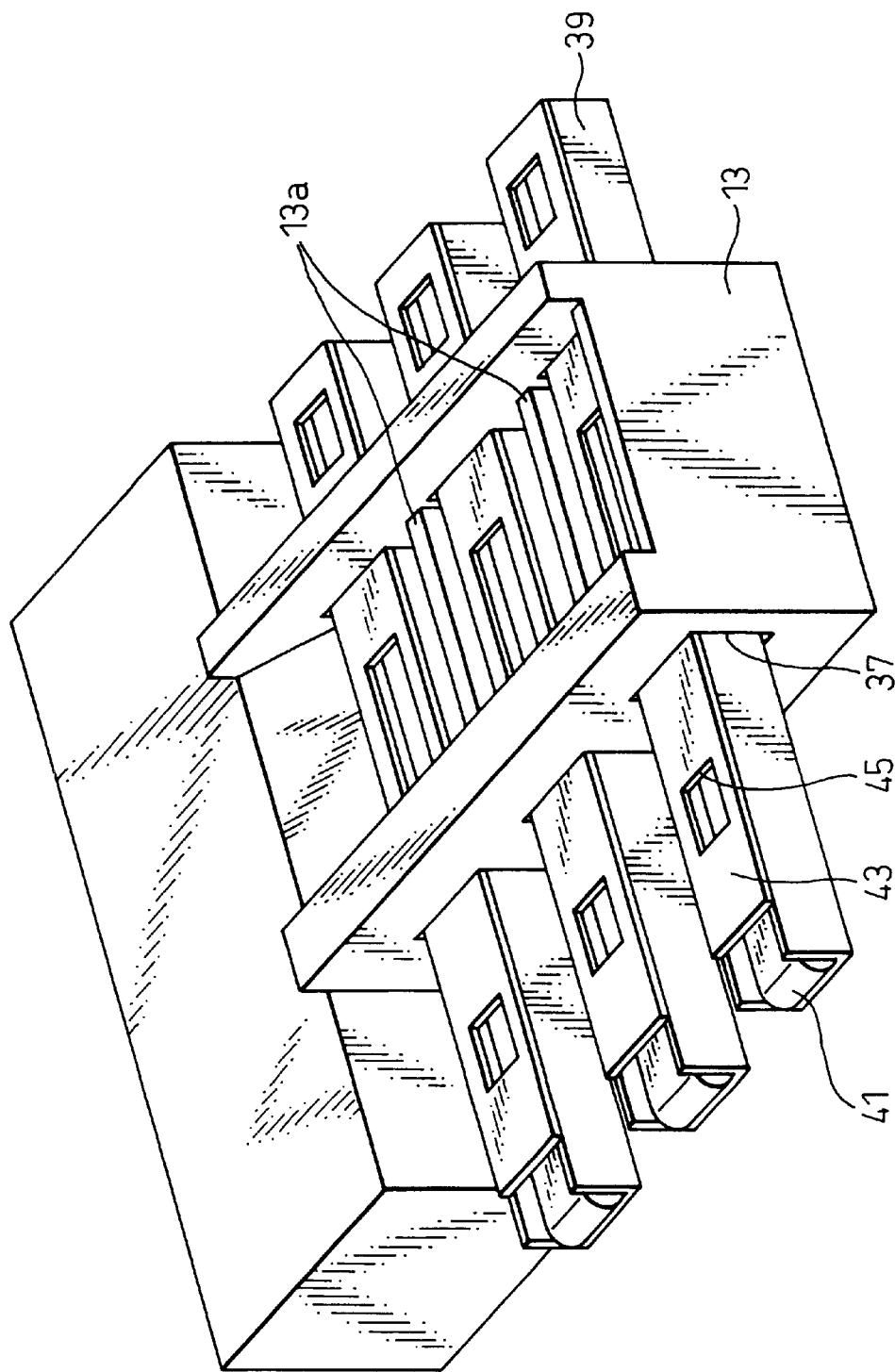

MACHINE TOOL

BACKGROUND OF THE INVENTION

1. Field of the Invention

The present invention relates to a machine tool which machines a workpiece by moving a tool mounted on a spindle and the workpiece relative to each other and, in particular, to a machine tool that has an excellent chip discharge capability.

2. Description of the Related Art

In the field of machine tools, effectively discharging to the outside of the machine tool large amounts of cutting chips produced when machining the workpiece with the tool is very important. For example, Japanese Unexamined Utility Model Publication No. 58-93437 (more particularly, FIG. 3 thereof) proposes a structure which drops cutting chips, along an angled cover which covers a guide means and a feed screw in a workpiece table and which is inclined downward from the center toward left and right, into troughs arranged in a bed on both the right and left sides of the workpiece table, to collect the cutting chips in the right and left troughs. Also, Japanese Unexamined Patent Publication No. 9-309042 (more particularly, FIG. 1 thereof) proposes a structure which provides a concave trough, extending parallel to the direction of movement of a table, in the center of a bed, and which drops cutting chips along a trough-shaped cover which is inclined downward from the left and right sides toward the center to collect the chips in the concave trough. Further, Japanese Unexamined Utility Model Publication No. 2-35634 proposes a structure which provides a chip collection port, arranged on the upper surface of a bed, for dropping cutting chips into a chip conveyor which extends through the bed.

In addition, Japanese Unexamined Utility Model Publication No. 60-175541 proposes a structure which provides a chip collection channel, on both the far and near sides of a table, extending parallel to the direction of movement of the table and having a screw conveyor arranged therein; Japanese Unexamined Patent Publication No. 61-103754 proposes a structure which provides a chip collection channel, between a table and a column, extending in a direction perpendicular to the direction of movement of the table and having a lift conveyor arranged therein, and a structure in which inclined surfaces are formed on a bed surrounding a table, for guiding cutting chips and a cutting fluid to a screw conveyor arranged in a chip collection channel; and Japanese Unexamined Patent Publication No. 8-57739 proposes a structure which provides a chip collection channel, between a table and a column, extending parallel to the direction of movement of the table and having a screw conveyor arranged therein.

However, the above-mentioned conventional structures encounter the following problems.

In the structure disclosed in Japanese Unexamined Utility Model Publication No. 58-93437, if applied to an increased size of the machine tool, the distance between the troughs provided on both sides also increases, and therefore there is the problem that the angle of inclination of the angled cover cannot be steep so that chips are likely to accumulate on the surface of the inclined cover. In the structure disclosed in Japanese Unexamined Patent Publication No. 9-309042, the table feed screw is located in the center of the bed, i.e. above the concave trough and therefore takes much space above the trough to make it difficult for the chips to fall into the trough. In addition, as the concave trough is arranged parallel to the direction of movement of the table, the cutting chips are discharged from the front or rear portion of the machine to the outside. This raises the problem of the machine taking up a large area for installation. Also, because a concave channel for mounting the concave trough component therein is formed in the bed, the rigidity of the bed is reduced. There is also the problem that, as the size of the machine increases, the angle of inclination of the angled cover decreases to be gentler so that chips accumulate on the cover. In the structure disclosed in Japanese Unexamined Patent Publication No. 8-57739, there is the problem that, as the chip collection channel is provided only between the table and the column, the cutting chips and cutting fluid that scatters towards the front of the table cannot be collected. Further, in the structures wherein the cutting chips and cutting fluid fall directly onto the bed as disclosed in Japanese Unexamined Utility Model Publication No. 60-175541, Japanese Unexamined Patent Publication No. 61-103754, and Japanese Unexamined Utility Model Publication No. 2-35634, there is the problem that high temperature cutting chips and cutting fluid may cause heat deformation in the bed and result in the reduced precision of the machine tool.

SUMMARY OF THE INVENTION

The object of the present invention is to provide a machine tool which, while improving the capability of discharging and collecting the cutting chips generated by machining the workpiece, does not increase the size and complexity of the structure of the machine tool and does not generate heat deformation of the bed due to high temperature cutting chips and cutting fluid.

The present invention, in view of the above object, provides a machine tool which is provided with a bed having troughs extending in a direction perpendicular to the direction of the movement of the table, thereby to collect the cutting chips, falling from the table down to its surrounding, in the troughs through a plurality of chutes, and to discharge the cutting chips collected in the troughs to the outside.

Specifically, the present invention provides a machine tool for machining a workpiece by moving the workpiece and a tool relative to each other, which includes a bed serving as a base; a spindle head for rotatably supporting a spindle having the tool mounted thereon; a table for the workpiece to be mounted thereon, the table moving along guide means disposed on the upper surface of the bed; table feed means for moving the table along the guide means; an inclined cover for covering the guide means and the table feed means of the table and causing cutting chips generated by machining the workpiece to fall downwards; a plurality of chutes having openings for collecting the cutting chips below the upper surface of the table; a trough for receiving the cutting chips collected by the plurality of chutes, the trough extending through the bed below the table and in a direction substantially perpendicular to the direction of the movement of the table; and chip discharge means for discharging the cutting chips received by the troughs to the outside, the chip discharge means disposed in the trough.

Preferably, the above machine tool includes a plurality of the troughs, and the chip discharge means are disposed in each of the plurality of the troughs.

Preferably, the table moves along two spaced guide means, and the plurality of chutes are composed of a central chute arranged between the guide means of the table, and left and right chutes arranged on either outer side of the guide means of the table.

Further, the plurality of chutes and troughs are preferably spaced apart from the bed.

In the machine tool according to the present invention, the cutting chips and cutting fluid falling down from the table are led into and collected in troughs extending through the bed, through the plurality of chutes arranged so as to cover the surface surrounding the table below the upper surface of the table. Therefore, the cutting chips and cutting fluid can be prevented from scattering around the table and falling down on the bed to generate heat deformation in the bed. Also, because the troughs and chutes are spaced apart from the bed and the cutting chips and cutting fluid are discharged to the outside through the chip discharge means, the high temperature cutting chips and fluid collected in the trough do not generate heat deformation in the bed, as in the prior art, where the high temperature cutting chips and fluid are collected directly in the bed. Further, since the troughs and the chip discharge means are arranged so that the longitudinal direction thereof is perpendicular to the direction of the movement of the bed, the size of the machine tool in the front to rear direction is not increased.

When the machine tool includes a plurality of troughs and the chip discharge means disposed in each of the troughs, the cutting chips and cutting fluid can be more efficiently discharged to the outside of the machine tool. In addition, if the plurality of chutes are disposed in the center and in the right and left side thereof, the capability of collecting the cutting chips can be improved.

It should be noted that a tool charger, etc., are typically arranged by the side of the machine tool, and that if a chip recovery means for recovering the cutting chips and cutting fluid discharged to the side of the bed is arranged under the tool changer, the size of the machine tool in the lateral direction is not increased either.

Also, when the table feed means and the guide means are covered by the cover means, the cutting chips falling from the table can be prevented from attaching to and becoming caught up in the table feed means and the guide means.

Further, the plurality of chutes are formed with the opening inclined downward toward the troughs and the cutting chips do not accumulate on the inclined covers even if the size of the machine is increased. If the troughs are installed using the cast hole formed in the bed by casting, the rigidity of the bed is not reduced.

BRIEF DESCRIPTION OF THE DRAWINGS

The above and other features and advantages of the present invention will become more apparent from the following detailed description of the invention taken in conjunction with the accompanying drawings, wherein:

FIG. 3 is a perspective view of the bed with the feed screws, guide rails and chutes removed from the bed of FIG. 2 in order to show the structure of the troughs.

DESCRIPTION OF THE PREFERRED EMBODIMENTS

The preferred embodiments according to the present invention will hereafter be described with reference to the drawings.

Figure 1:
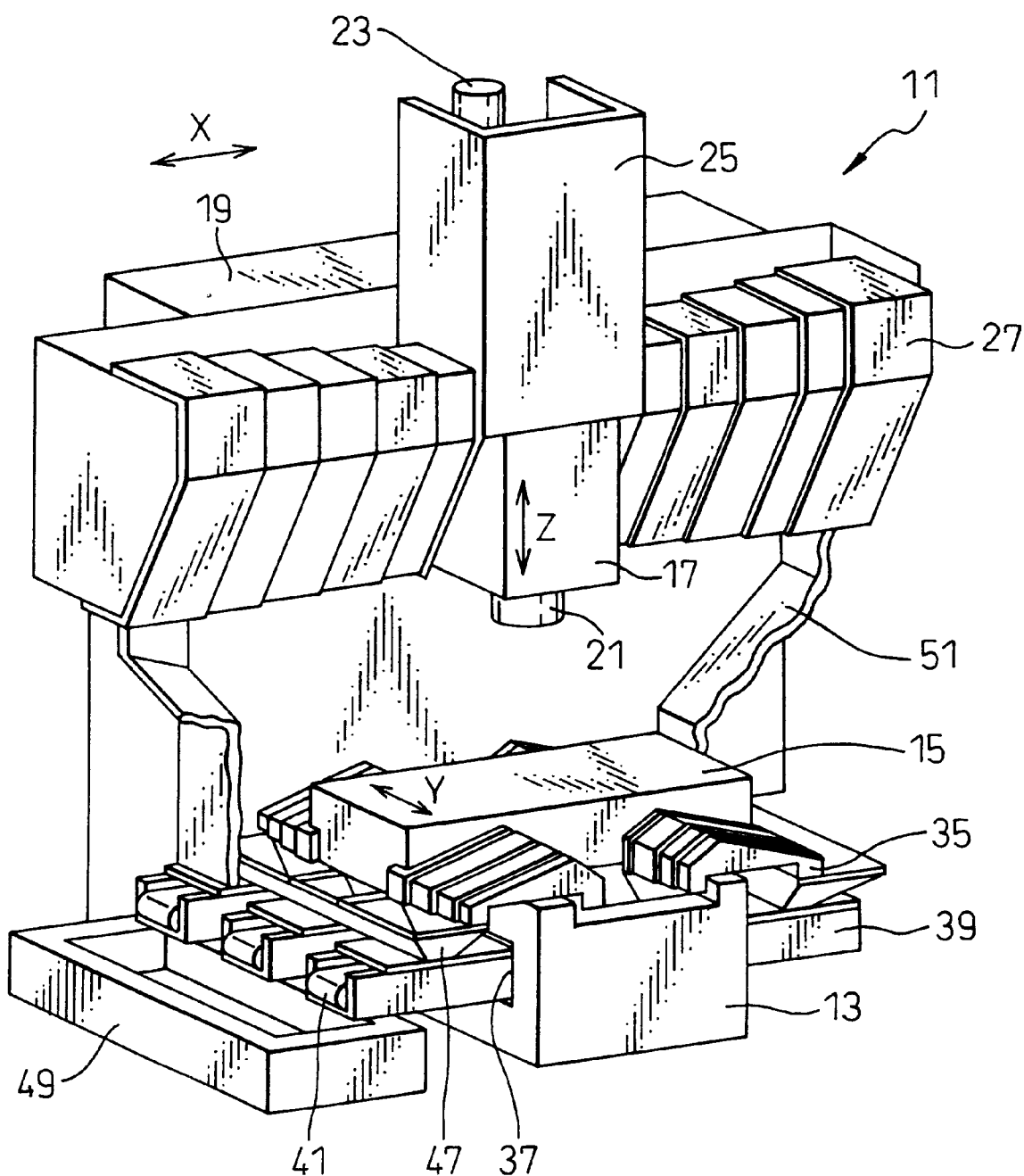
FIG. 1 is a perspective view of the overall structure of the machine tool according to the present invention.

As shown in FIG. 1, the present invention is a machine tool 11 for performing a desired machining on a workpiece by moving the workpiece and a tool relative each other in direction along the three orthogonal linear feed axes, i.e., X-, Y- and Z-axes. Although the machine tool 11 preferably has a protective panel such as a splash guard to prevent cutting chips and cutting fluid from scattering to the outside, this has been omitted from the figures for the purpose of explanation.

Figure 2:
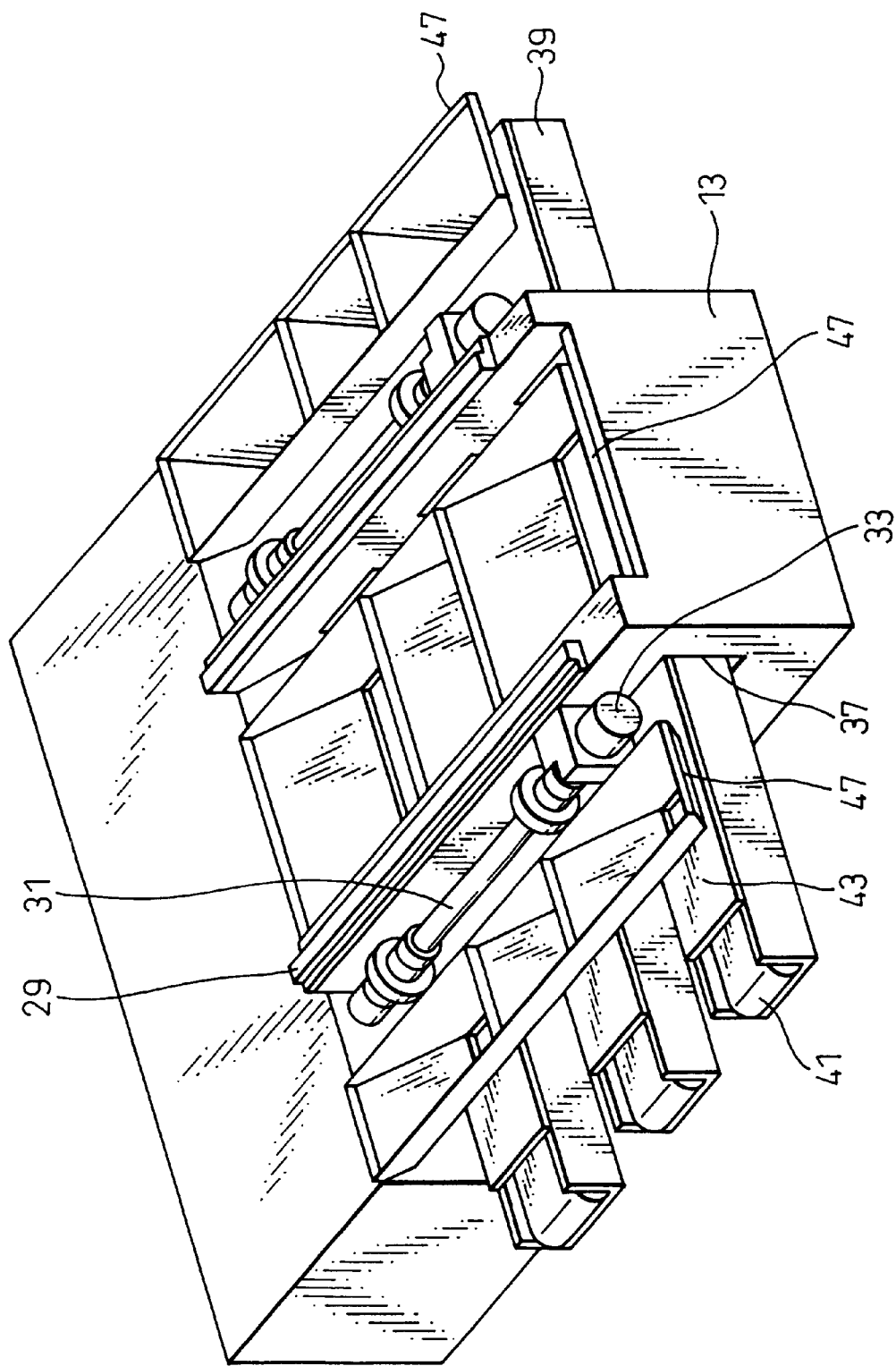
FIG. 2 is a perspective view of the bed with the column, table, etc. removed in order to show the arrangement of the chutes and feed screws.

The machine tool 11 includes a bed 13 serving as a base, a table 15, on which a workpiece (not shown) is removably secured and which is supported on the upper surface of the bed 13, a spindle head 17 disposed above the table 15, a column 19 located behind the bed 13 for supporting the spindle head 17, and a plurality of chutes 47 arranged around the table 15 so as to cover the upper and side portions of the bed 13. Although the bed 13 of the machine tool 11 according to the present embodiment is configured to be in a T-shape as shown in FIGS. 2 and 3, it can be in another shape, such as rectangular shape.

More particularly, the spindle head 17 is supported by the column 19 via a saddle (not shown) which is supported to be movable in the direction along the X-axis (in the lateral direction of the bed as seen from the operator). The spindle head 17 is supported to be vertically movable on the front portion of the saddle, and its movement in the direction along the Z-axis is performed by a Z-axis feed motor 23 provided in the upper portion of the saddle. Similarly, the movement of the saddle in the direction along the X-axis is performed by an X-axis feed motor, which is not shown in the figures.

In the machine tool 11 shown in FIG. 1, a cover 25 is provided for covering the spindle head 17, and in order to prevent cutting chips and cutting fluid from attaching to the guide rail (not shown) for guiding the saddle, a so-called telescopic cover (extendible/contractible cover) 27, which can extend and contract in the direction along the X-axis (in the lateral direction) along with the movement of the saddle in the direction along the X-axis, is provided on either side of the saddle to cover the guide rail from above.

Also, a spindle 21 is rotatably supported in the spindle head 17, and a tool (not shown) is held via a tool holder (not shown) at the end of the spindle 21. Accordingly, the spindle 21 rotatably supported in the spindle head 17 is moveable in the directions along both the X-axis and Z-axis with respect to the table 15.

On the other hand, the table 15 is linearly moveable, in the direction along the Y-axis (in the forward/backward direction as seen from the operator), on the bed 13 along guide means such as guide rails 29 (FIG. 2) provided on the upper surface of the front portion of the bed 13, via linear motion bearings or the like (not shown) provided on the lower surface of the table 15. The guide means may be a slide guide surface. Referring to FIG. 2, a pair of guide rails 29 are arranged along the left and right edges of the bed 13, and feed screws 31 and Y-axis feed motors 33 for moving the feed screws 31 are mounted on the right and left side surfaces of the bed 13 outside the guide rails 29, in order to move the table 15 along the guide means such as the guide rails 29 or the like. In order to prevent cutting chips and cutting fluid from attaching to the guide rails 29, the feed screws 31 and the Y-axis feed motors 33, telescopic covers 35, extendible/contractible in the direction along the Y-axis along with the movement of the table 15 in the direction along the Y-axis, are provided on both sides in front of and behind the table 15, to cover the guide rails 29, the feed screws 31 and the Y-axis feed motors 33 from above. Also, the telescopic covers 35 are formed in an angled shape (peaked shape) and the surfaces thereof are inclined downward from the center to the outer edges so that the cutting chips and cutting fluid falling from the table 15 cannot accumulate on the top thereof.

The front portion of the bed 13, as shown clearly in FIG. 3, is formed in a box shape having a recessed portion in the center and with reinforcing ribs 13a arranged therein, and three sets of through holes 37 extending into the central recessed portion are formed in left and right pairs in either side surface of the front portion of the bed 13 (in the left and right side surfaces as seen from the operator). Three U-shaped sheet metal troughs 39 open at the top pass through the paired through holes 37 and are fixed to the bed 13 via metal attachment washers or spacers so that there is a predetermined gap between the troughs 39 and the bed 13 for the main purpose of thermally isolating the troughs 39 from the bed 13. The cast holes formed in the bed 13 by casting may be used as the through holes 37. The through holes 37 may also be formed separately from the cast hole. Thus, the troughs 39 extend in a direction perpendicular to the direction of the movement of the table 15. A known chip discharge means 41 such as a chain conveyor or hinge conveyor, suitable for discharging the cutting chips that have been accumulated in the troughs 39, is disposed in each of the troughs 39.

A plurality of chutes 47 are juxtaposed parallel to the guide rails 29, in the central recessed portion of the bed 13, i.e. in the space between the pair of guide rails 29, as well as in the side spaces outside the guide rails 29. Further, the lower ends of both angled inclined surfaces of the telescopic covers 35 covering the guide rails and the feed screws overhang the chutes 47. The telescopic covers 35 and chutes 47 arranged in this way cover a wide area around the periphery of the table 15 below the upper surface thereof, so that the cutting chips and cutting fluid falling from the table 15 are received and collected in the troughs 39.

As shown in FIG. 3, trough covers 43 may also be provided above the troughs 39 to accommodate the chutes 47 and the like. In such a case, openings 45 must be formed in suitable locations on the trough covers 43 in order to allow the cutting chips to pass from the chutes 47 into the troughs 39 through the trough covers 43.

Again referring to FIG. 1, a recovery tank 49 is provided at the side of the bed 13 as a chip recovery means for recovering the cutting chips and cutting fluid which are collected in the troughs 39 and which are discharged to the outside of the bed 13 and troughs 39 by the chip discharge means. It is also possible to combine various types of conveyors with the recovery tank 49 to transport the cutting chips to the outside of the machine tool from the recovery tank 49. In addition, it is possible to use a lift conveyor as the chip recovery means.

In order to more effectively collect the cutting chips and cutting fluid which are scattered from the table, it is preferable to provide a splash guard, side covers 51 and the like around the machine tool 11 to surround the space around the machine tool 11, and with the surfaces thereof closely contacting to the lips of the chutes as shown in FIG. 1, so that when the cutting chips and cutting fluid attached to those surfaces fall, they are received in the chutes 47.

In the machine tool 11 as constructed above, it is possible to provide the chutes 47, without a gap, around the table 15 below the upper surface thereof except for the area on the upper surface of the bed 13 where the guide means such as the guide rails 29 are provided. It is also possible to provide the steeper angles of the covers for protecting the guide rails 29 and the like from the cutting chips and cutting fluid.

Next, the operations of the machine tool according to the present invention will be described with reference to the embodiment shown in FIGS. 1 to 3.

When a workpiece detachably fixed on the table 15 is machined by a tool mounted to the spindle 21, the cutting chips and cutting fluid used for cooling and lubrication during the machining of the workpiece are scattered around the surrounding spaces by the machining job. At this time, in the machine tool 11 according to the present invention, the cutting chips and cutting fluid scattering from the table 15 are likely to fall onto the telescopic covers 35 thereby to be received in chutes 47, without falling directly onto and attaching to the bed 13. Even when the table 15 is driven in the direction along the Y-axis by the feed screws 31 to move forward/backward along the guide rails 29, the guide rails 29 and the feed screws 31 are covered by the telescopic covers 35 and therefore the cutting chips and cutting fluid do not fall directly onto and attach to the guide rails 29 and the feed screws 31, but fall onto the telescopic covers 35 thereby to move or flow along the angled inclined surfaces thereof into the chutes 47. Also, the cutting chips and cutting fluid attached to the splash guard or the like are similarly received in the chutes 47. At this point, if the contact area between the chutes 47 and the bed 13 is reduced, for example, by attaching the chutes 47 to the trough covers 43, the amount of heat transferred to the bed 13 from the cutting chips and cutting fluid via the chip collect means is reduced thereby to make it possible to decrease the heat deformation of the bed 13.

Next, the cutting chips and cutting fluid received in the chutes 47 are led through the openings 45 of the trough covers 43 into and collected in the troughs 39. At this point, because the troughs 39 are not in direct contact with the bed 13 but are spaced apart from the bed 13, the amount of heat transferred from the high temperature cutting chips and cutting fluid to the bed 13 can be minimized thereby to avoid heat deformation of the bed 13 and to have little effect on the accuracy of the machining. Also, as the cutting chips and cutting fluid led into the troughs 39 are discharged from the troughs 39 to the outside of the bed 13 and troughs 39 by the chip discharge means 41, the amount of time that they stay in the troughs 39 is shortened so that the amount of heat transmitted to the bed 13 from the high temperature cutting chips and cutting fluid can be further reduced.

Subsequently, the cutting chips and cutting fluid are transported to the recovery tank 49 at the side of the bed 13 and collected outside the machine.

Although a bed 13 having a large central recessed portion in the front portion thereof has been described in the above example, the bed 13 may be provided with a plurality of openings, through which chutes 47 are in turn disposed, extending through the upper surface of the bed 13 to the troughs 39. Further, the floors of the troughs 39 may be sloped so that the cutting chips and cutting fluid are more easily discharged from the troughs 39.

Also, in the above embodiment, although the troughs have been described as being three in number, it is also possible to use one, two or four or more troughs 39, and various arrangements thereof can be contemplated. The chutes 47 are also not limited to three disposed at the center and right and left sides, but can also be divided into three each to form a total of nine chutes. Various arrangements of such the chutes 47 also may be contemplated. For example, in the case that only one trough is provided in the bed 13, a wide trough can be used and similarly a wide chip discharge means can be disposed therein. In this case, it would be preferable to use wide chutes that can cover entire upper portion of the bed 13. It is of course better to make the inclination angle of the chutes steeper.

According to the present invention as described above, a plurality of chutes are disposed around the table so that they cover the upper surface and side portions of the bed, and therefore the cutting chips and cutting fluid falling from the table can be led into and collected in the troughs via these chutes to be discharged to the outside. Therefore, it is possible in the machine tool to improve the capability of collecting and discharging the cutting chips and cutting fluid. Also, since the troughs and the chutes are spaced apart from the bed, the amount of heat transferred from the high temperature cutting chips and cutting fluid collected in the chutes and troughs can be minimized. This prevents a decrease in the accuracy of the machining due to heat deformation of the bed. Further, by arranging the troughs perpendicular to the direction of the movement of the table, space is effectively utilized and there is no increase in the size of the machine tool in spite of the improvement in the cutting chip and cutting fluid collection and discharge capabilities thereof. In addition, there is no necessity to form a concave channel in the bed to mount the troughs therein and secure machining can be performed with no reduction in the rigidity of the bed.

What is claimed is:

1. A machine tool for machining a workpiece by moving the workpiece and a tool relative to each other, the machine tool comprising:
   a bed serving as a base;
   a spindle head for rotatably supporting a spindle having said tools mounted thereon;
   a table for said workpiece to be mounted thereon, said table moving along guide means disposed on the upper surface of said bed;
   table feed means for moving said table along said guide means;
   an inclined cover for covering said guide means and said table feed means of said table and causing cutting chips generated by machining said workpiece to fall downwards;
   a plurality of funnel-like chutes having openings for collecting the cutting chips below the upper surface of said table;
   a trough for receiving the collected cutting chips from said chutes through said opening thereof,
   chip discharge means for discharging the cutting chips received by said trough to the outside, said chip discharge means disposed in said trough.

2. The machine tool according to claim 1, wherein said machine tool comprises a plurality of said troughs, said chip discharge means disposed in each of said plurality of the troughs.

3. The machine tool according to claim 1 or claim 2, wherein said table moves along two spaced guide means, and wherein said plurality of chutes are composed of a central chute arranged between said guide means of said table, and left and right chutes arranged on either outer side of said guide means of said table.

4. The machine tool according to any one of claims 1–2, wherein said plurality of chutes and troughs are spaced apart from said bed.

5. The machine tool according to claims 3, wherein said plurality of chutes and troughs are spaced apart from said bed.

6. A machine tool for machining a workpiece by moving the workpiece, said machine tool being adapted to collect cutting waste, comprising:
   a bed serving as a base;
   a table for said workpiece to be mounted thereon, said table being mounted for movement back and forward along the upper surface of said bed;
   table feed means for moving said table;
   an inclined extensible cover adjacent said table for causing cutting waste to fall downwards there along and away from said table;
   at least one chute for collecting said cutting waste falling from said inclined cover;
   at least one trough extending transversely through said bed tar receiving said chute collected cutting waste; and
   discharge means positioned one each within each said trough for discharging said cutting waste outwardly;
   also including a recover tank positioned to receive said cutting waste discharged outwardly by said discharge means;
   wherein the floor of each said through is sloped thereby aiding said discharge from each said trough; and
   wherein each said chute includes a splash guard.

7. The machine tool of claim 6, including a plurality of chutes positioned on each transverse side of said table, said chutes on said either transverse side being contiguous with one another.

8. The machine tool of claim 7 including a plurality of transversely extending troughs, one servicing each pair of opposing transverse side chutes.

9. The machine tool of claim 8, wherein each said transversely extending trough has a top wall cover, said top wail cover including an plurality of openings one each accomodating a respective chute.

10. The machine tool of claim 6, wherein said incline of said cover is away from said table.

11. The machine tool of claim 6, wherein said discharge means includes a conveyor.

12. The machine tool of claim 11, also including a container positioned for receiving said conveyor discharge.

* * * * *